US012562678B2

(12) United States Patent
Hansel et al.

(10) Patent No.: US 12,562,678 B2
(45) Date of Patent: Feb. 24, 2026

(54) HIGH STOW SOLAR TRACKER WITH HAIL PROTECTION

(71) Applicant: Terabase Energy, Inc., Berkeley, CA (US)

(72) Inventors: Adam Hansel, Davis, CA (US); Brian Coleman, Portland, OR (US); Dylan Harper, Vancouver, WA (US); Johann Fritz Karkheck, Petaluma, CA (US); Mark Peter Shroeder, Rancho Cordova, CA (US); Matthew Paul Campbell, Berkeley, CA (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 0 days.

(21) Appl. No.: 18/753,338

(22) Filed: Jun. 25, 2024

(65) Prior Publication Data

US 2025/0392251 A1     Dec. 25, 2025

(51) Int. Cl.
*H02S 20/32*     (2014.01)
(52) U.S. Cl.
CPC .................................... *H02S 20/32* (2014.12)
(58) Field of Classification Search
CPC ....................................................... H02S 20/32
See application file for complete search history.

(56) References Cited

U.S. PATENT DOCUMENTS

| | | | | |
|---|---|---|---|---|
| 2016/0365830 A1* | 12/2016 | Bailey | ...................... | F24S 25/11 |
| 2017/0022728 A1* | 1/2017 | Simik | ...................... | G05D 1/43 |
| 2017/0294871 A1* | 10/2017 | Shin | ...................... | H02S 30/20 |
| 2018/0212559 A1 | 7/2018 | Meller et al. | | |
| 2019/0024764 A1* | 1/2019 | Plesniak | ................. | H02S 20/32 |
| 2019/0199276 A1 | 6/2019 | Bailey et al. | | |
| 2021/0017584 A1 | 1/2021 | Hery-Arnaud et al. | | |
| 2021/0071914 A1* | 3/2021 | Worden | ................. | H02S 20/32 |
| 2021/0083619 A1* | 3/2021 | Hegedus | ................. | H02S 20/10 |
| 2021/0194417 A1* | 6/2021 | Sharpe | ................. | G05D 3/105 |
| 2022/0077813 A1* | 3/2022 | Raghuchandra | ........ | H02S 10/12 |
| 2022/0224282 A1* | 7/2022 | LoBue | ................. | G05D 3/105 |
| 2022/0325919 A1 | 10/2022 | Ona et al. | | |
| 2024/0019175 A1 | 1/2024 | Ma et al. | | |
| 2025/0167723 A1 | 5/2025 | Campbell | | |

OTHER PUBLICATIONS

International Search Report and Written Opinion of the International Searching Authority mailed Oct. 9, 2025 in related PCT application No. PCT/US2025/035154, (17 pgs).

\* cited by examiner

*Primary Examiner* — Sadie White
(74) *Attorney, Agent, or Firm* — Michael North

(57)     ABSTRACT

System and method embodiments are described for solar panel protection against severe environmental impacts. A tracker controller may be configured to rotate a solar tracker comprising a group of solar panels to a safe position to diminish hail impact during a hailstorm. Such a rotation may be implemented using one or more motors to drive arc gears coupled to a pair of supporting purlins that support the group of solar panels. The tracker may comprise a bumper rail placed on the top when the tracker is at the safe position for hail impact absorption. Implementing solar panel protection provides a practical solution to protect solar panels from damage. Thus, the need for costly repair or replacement may be avoided, minimized, or decreased. As a result, the economic efficiency of solar power plant operations may be improved significantly.

5 Claims, 12 Drawing Sheets

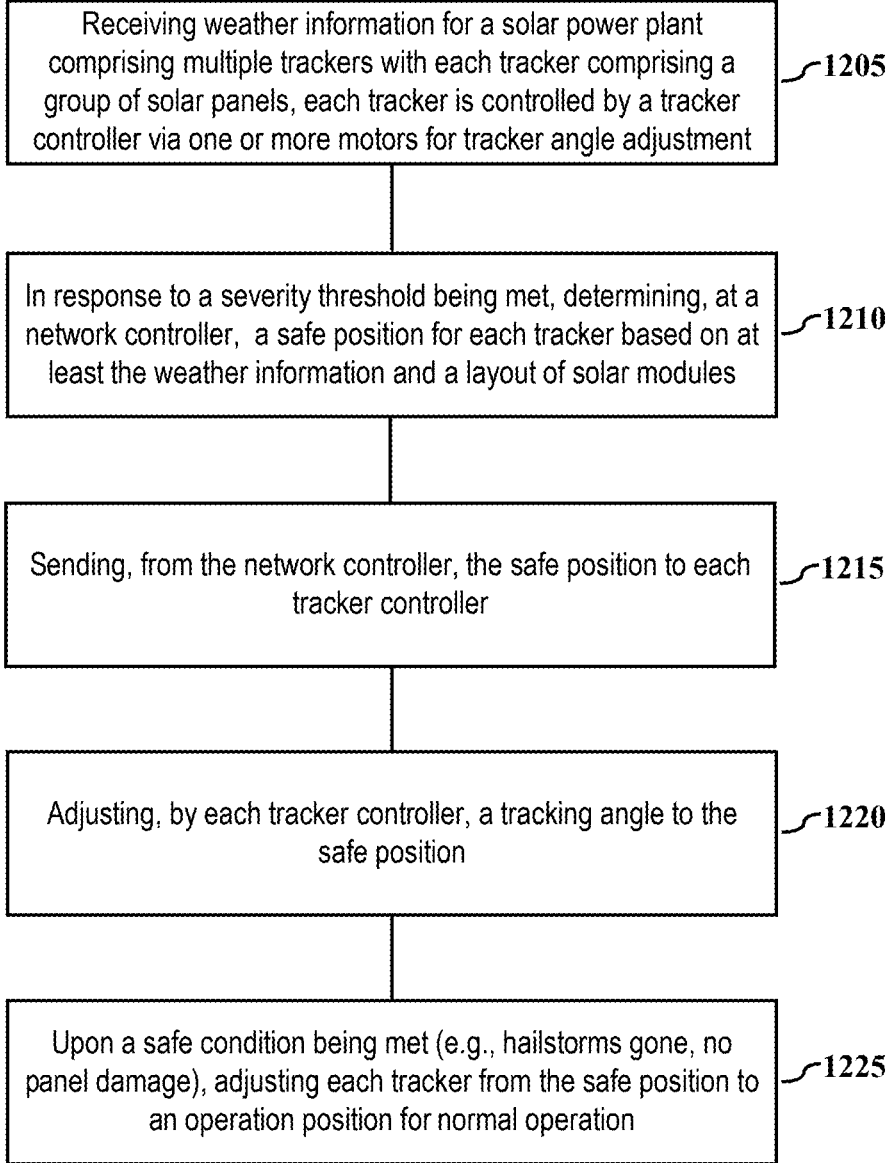

Receiving weather information for a solar power plant comprising multiple trackers with each tracker comprising a group of solar panels, each tracker is controlled by a tracker controller via one or more motors for tracker angle adjustment ⟿1205

In response to a severity threshold being met, determining, at a network controller, a safe position for each tracker based on at least the weather information and a layout of solar modules ⟿1210

Sending, from the network controller, the safe position to each tracker controller ⟿1215

Adjusting, by each tracker controller, a tracking angle to the safe position ⟿1220

Upon a safe condition being met (e.g., hailstorms gone, no panel damage), adjusting each tracker from the safe position to an operation position for normal operation ⟿1225

FIG. 12

HIGH STOW SOLAR TRACKER WITH HAIL PROTECTION

TECHNICAL FIELD

The present disclosure generally relates to solar panel protection. More particularly, the present disclosure relates to systems and methods for solar panel protection against severe environmental impacts.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is the safety management of installed solar panels to maintain operation efficiency.

In a solar power plant, multiple solar panels are securely aligned and attached to a structure to form a row of solar panels. Most solar power plants utilize tracking structures following the Sun's movement to maximize energy production. As shown in FIG. 1, a solar power plant may comprise one or more solar arrays, with each solar array having multiple rows of solar panels. Each row 105 comprises multiple solar panels 115 and may be supported by ground piles 120, via a torque tube 110. Considering the installation cost, a solar power plant is typically located in a remote area.

A solar power plant may suffer damage from severe environmental impacts during operation. Hail is one issue that could significantly impact the safety of solar power plant operations. In recent years, solar panel damage from hail has caused hundreds of millions of dollars in damage to various solar power plants. As severe weather conditions happen more and more frequently, the occurrence and severity of hail storms are increasing, thus leaving solar panels increasingly vulnerable to hail damage. Solar panels are typically tested for hail resistance by being shot at with ice balls of a specific size (e.g., 1.5-inch diameter) at a certain speed (e.g., 45 mph). However, there have been multiple hailstorms where hail sizes are much larger across the hail belt in the US alone. The larger the hail, the higher the velocity and impact energy.

When solar panels are damaged from hail, they need to be repaired or replaced. Given that solar power plants are typically located in remote areas, service or replacement will inevitably take extra effort, which results in additional costs for solar power plant operations, considering the offline time for those damaged solar panels. Accordingly, solar deployments in the hail regions, such as Texas, necessitate solutions to the hail problem.

What is needed are systems, devices, and methods for solar panel protection against severe environmental impacts.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

FIG. 12 depicts a process for operating the solar panel between an operative position and a protective position in accordance with various embodiments of the invention.

DETAILED DESCRIPTION OF EMBODIMENTS

Figure 1:
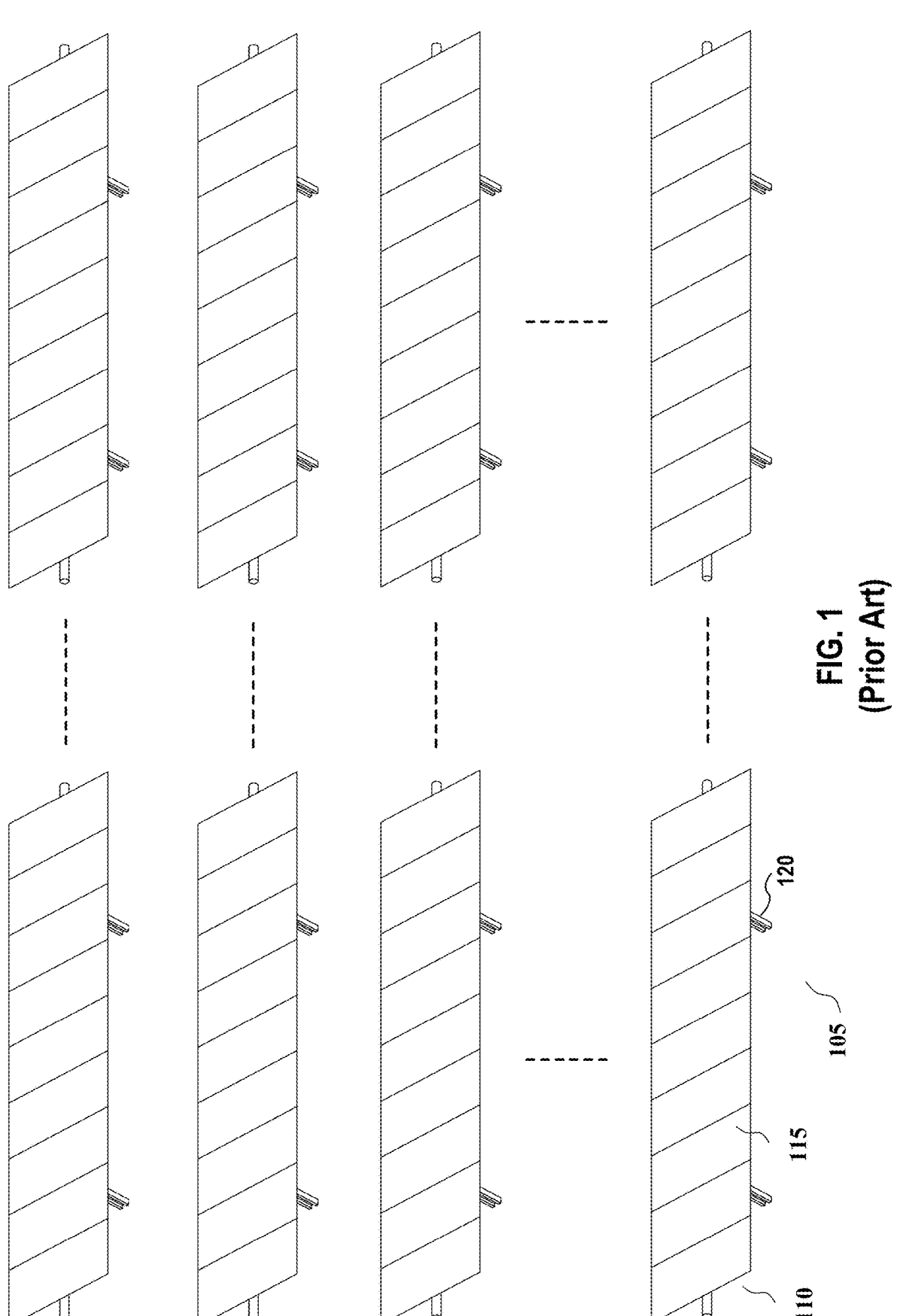
FIG. 1 depicts a solar power plant comprising multiple rows of solar panels in an operative position.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion, components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of protective screens of a solar module.

Furthermore, connectivity between components or systems within the figures is not intended to be limited to direct connections. Also, components may be integrated together or be discrete prior to the installation of a solar module.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different protective screens; and (4) certain functions may be performed concurrently or in sequence.

Furthermore, it shall be noted that many embodiments described herein are given in the context of the assembly and installation of large numbers of solar panels within a system, but one skilled in the art shall recognize that the teachings of the present disclosure may apply to other large and complex construction sites in which repair or replacement service and personnel are challenging to be provided in real-time.

In this document, the term "solar table" is defined as a structural assembly comprising one or more photovoltaic (PV) or solar panels and/or one or more frames (or purlins) for panel support. Some types of solar tables may have electrical harnesses and supplemental structures that allow them to connect to other solar panels or foundations/piles while other types do not have this supplemental structure. The term "safe position" is defined as a pre-determined orientation of a solar tracker comprising multiple solar panels or an orientation determined based on measured or forecast weather information, e.g., hail storm possibility, wind speed, wind direction, etc. The solar panels are less vulnerable to hail damage at the safe position than a normal operation position. The term "high-angle orientation" refers to a near-vertical orientation (e.g., between 70° and) 90°, a vertical orientation, or an obtuse orientation with 10-20° past the vertical orientation, wherein "vertical" refers to a perpendicular direction to a leveled ground. The term "severity threshold" is defined as a hail having a certain size (e.g., 2 inches or more in diameter) being measured or forecasted, a wind of a certain speed (e.g., 45 mph or higher) being measured or forecasted, a forecasted hail storm possibility higher than a pre-determined percentage, a forecasted hail storm duration higher than a pre-determined duration (e.g., 30 minutes), etc.

Figure 2:
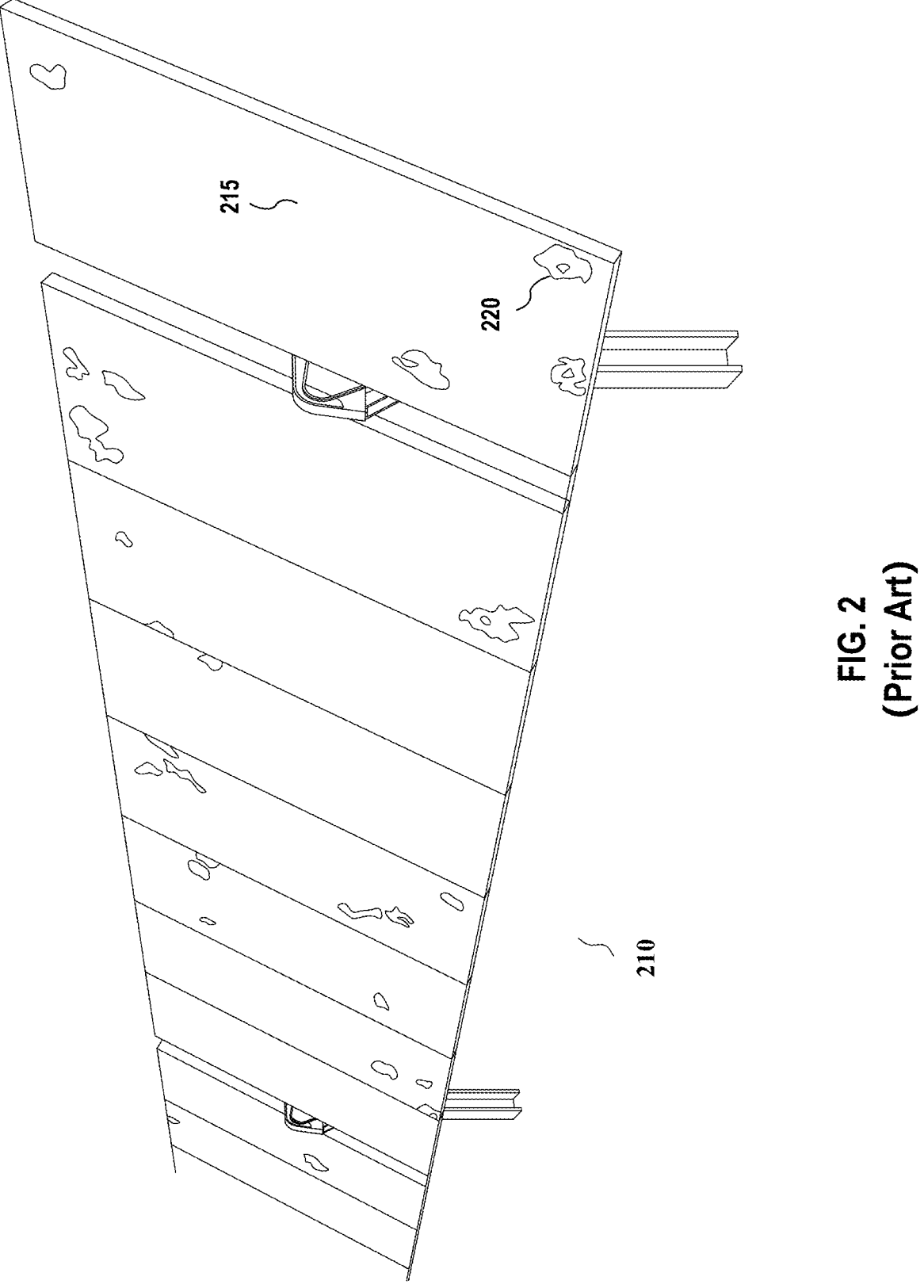
FIG. 2 depicts hail damaged panels in a row of solar panels.

As described in the background, a solar power plant may suffer damage from severe environmental impacts during operation. Hail is an issue that could significantly impact the safety of solar power plant operations. Various measures have been taken to minimize hail impact. FIG. 2 depicts multiple panels 215 in a row of solar panels 210 damaged during a hailstorm. As shown in FIG. 2, the solar panels with catastrophic hail damage 220 need to be repaired or replaced.

Since most solar power plants are located in remote areas, service or replacement will inevitably take extra effort, which results in additional costs for solar power plant operations besides the extra offline time for those damaged solar panels. Accordingly, solar deployments in the hail regions, such as Texas, necessitate solutions to the hail problem.

Described hereinafter are systems and methods embodiments for solar panel protection against severe environmental impacts. Implementing solar panel protection provides a practical solution to protect solar panels from damage. Thus, the need for costly repair or replacement may be avoided, minimized, or decreased. As a result, the economic efficiency of solar power plant operations may be improved significantly.

Figure 3:
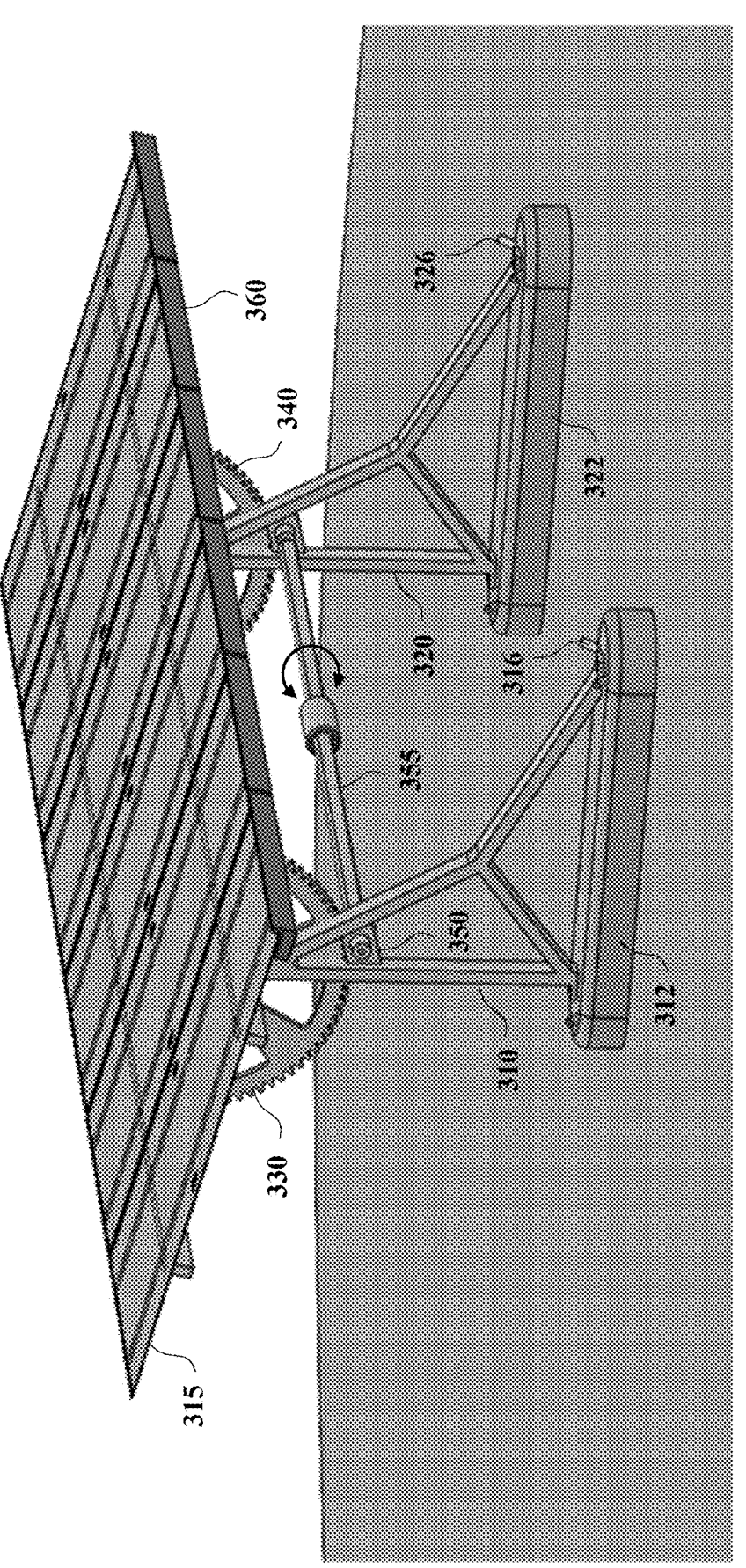
FIG. 3 depicts a perspective view of a row of solar panels in a normal tracking position supported by asymmetrical foundations in accordance with various embodiments of the invention.
Figure 4:
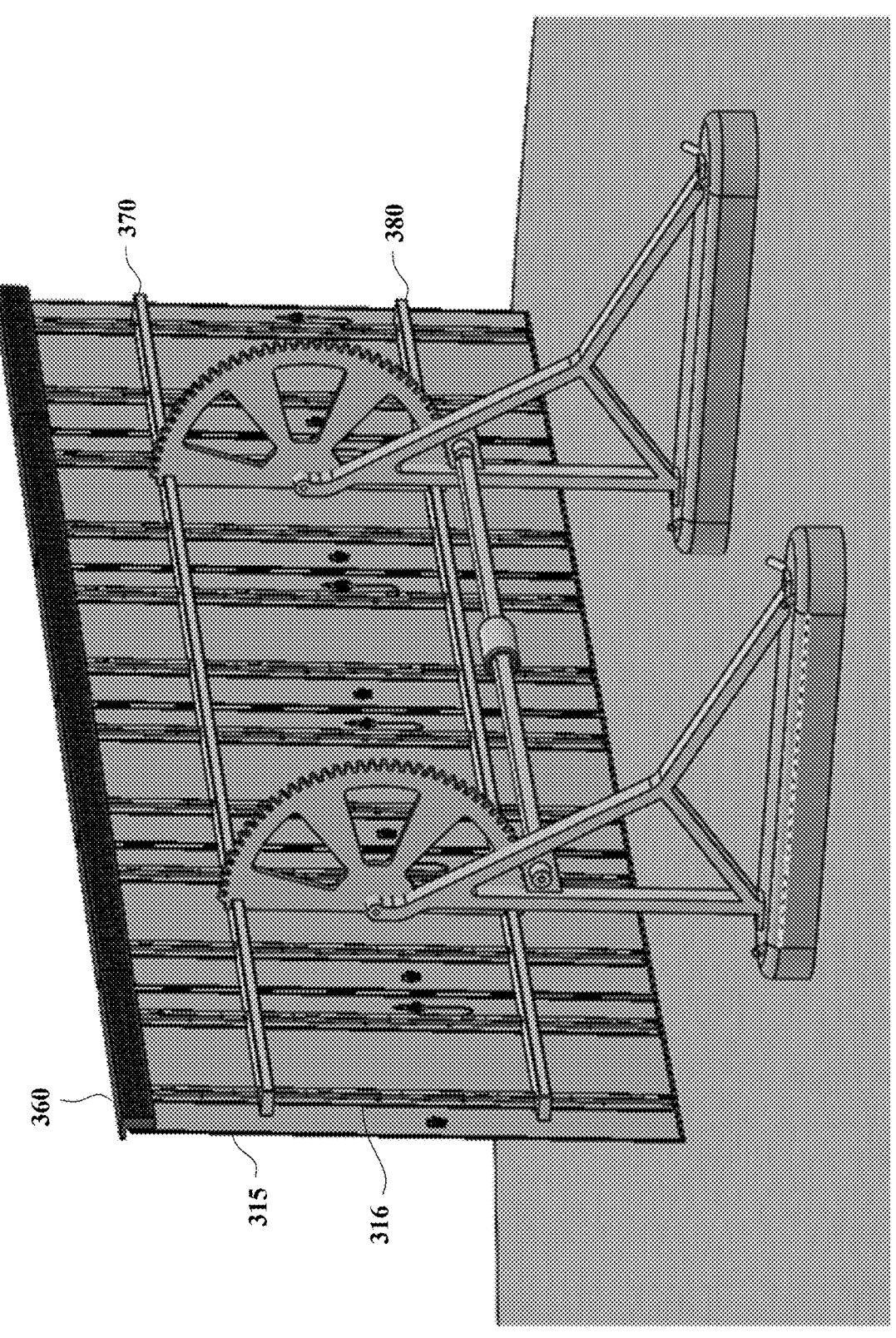
FIG. 4 depicts a perspective view of a row of solar panels rotated to a protective position supported by asymmetrical foundations to diminish hail impact during a hailstorm in accordance with various embodiments of the invention.
Figure 5:
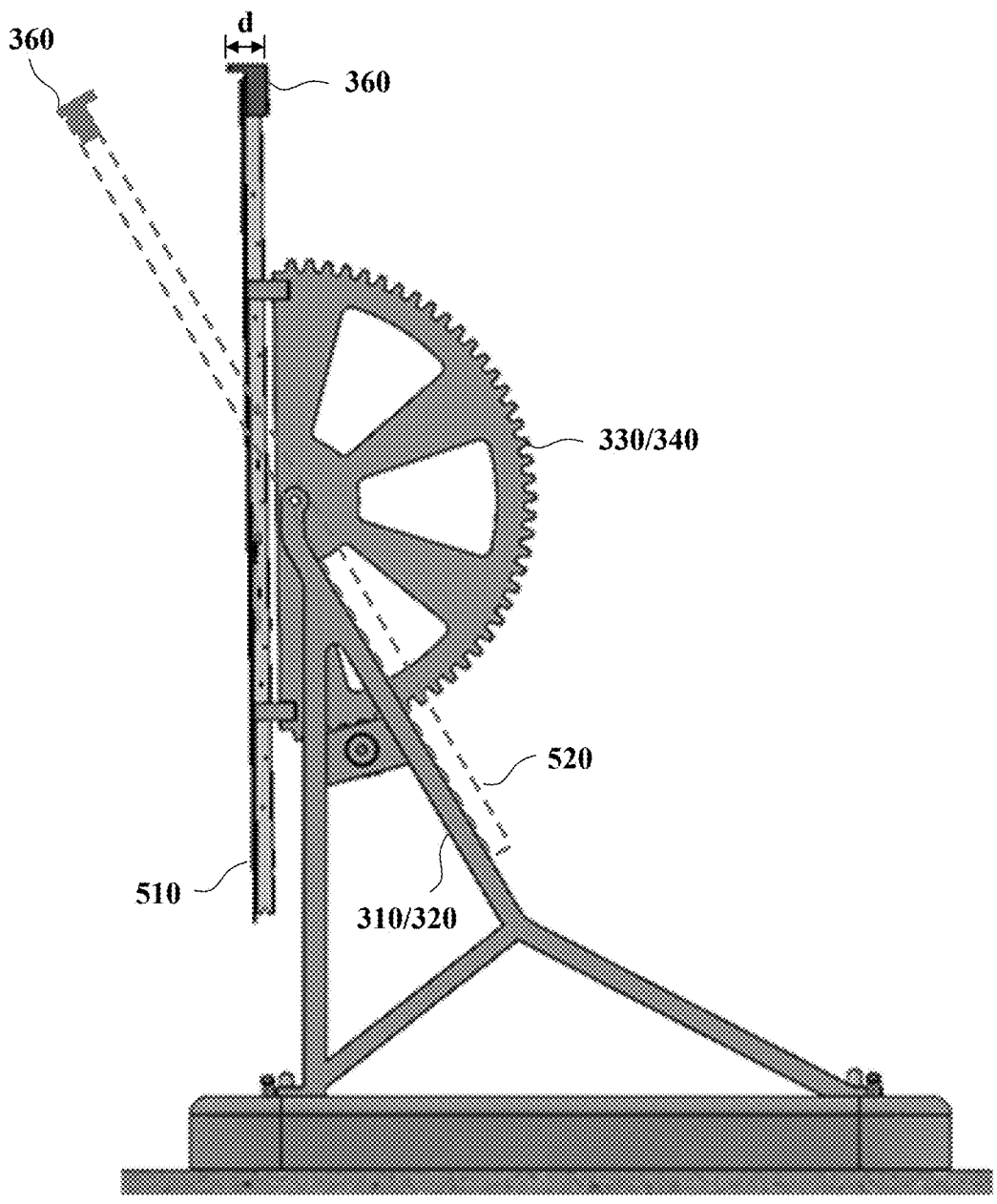
FIG. 5 depicts a side view of a row of solar panels in a protective position supported by asymmetrical foundations in accordance with various embodiments of the invention.

FIG. 3 depicts a perspective view of a row of solar panels in a normal tracking position supported by asymmetrical foundations, and FIG. 4-5 depict a perspective view and a side view of the row of solar panels rotated to a protective position supported by asymmetrical foundations to diminish hail impact during a hailstorm, in accordance with various embodiments of the invention. Such a row of solar panels with corresponding structures, e.g., supporting rails and orientation control components, are also referred to as "a solar tracker" or "a tracker" hereinafter. An orientation of the solar panels of the tracker is also referred to as a tracking angle of the tracker. Shown in the figures is a row of solar panels 315, with each solar panel having one or more rails 316 mechanically coupled to a pair of supporting purlins 370/380, which are supported by a pair of gears 330/340. The gears 330/340 may be arc gears driven by a drive gear 350 mounted on a drive line 355 powered by one or more motors controlled by an automatic tracker controller (e.g., a tracker controller 830 shown in FIG. 8) that enable the solar panels 315 to point in a direction during normal operation to maximize the energy collection from the Sun. It shall be noted that the arc gear described in embodiments of the present disclosure is referred to as a large gear that moves the solar panels or the solar table in an arc or a partial rotation, instead of a gear set with teeth in an arc shape to reduce gear noises.

The gears 330/340 are rotably coupled to a pair of asymmetrical foundations 310/320 such that the gears 330/340 may be rotated to position the plurality of solar panels 315 to different orientations. In one or more embodiments, the rotation may be bidirectional with the same or differential angular range for each rotation direction. For example, the plurality of solar panels 315 may be rotated into a first safety orientation 510 (e.g., a vertical orientation facing leftside, as shown in FIG. 5) or be rotated in an an opposite direction into a second safety orientation 520 (e.g., a near-vertical orientation facing rightside, as shown in the dashed line in FIG. 5). Depending on weather information, e.g., wind speed and direction, the plurality of solar panels 315 may be positioned at the first safety orientation 510, the second safety orientation 520, or any orientations in between. The second safety orientation 520 facing rightside may also be referred to as an "inverted" orientation due to opposite rotation direction. The solar panels 315 may be protected by a bumper rail 360 only or the bumper rail combined with a back side cover, e.g., a metal net or mesh covering the back side of the panels.

Figure 6:
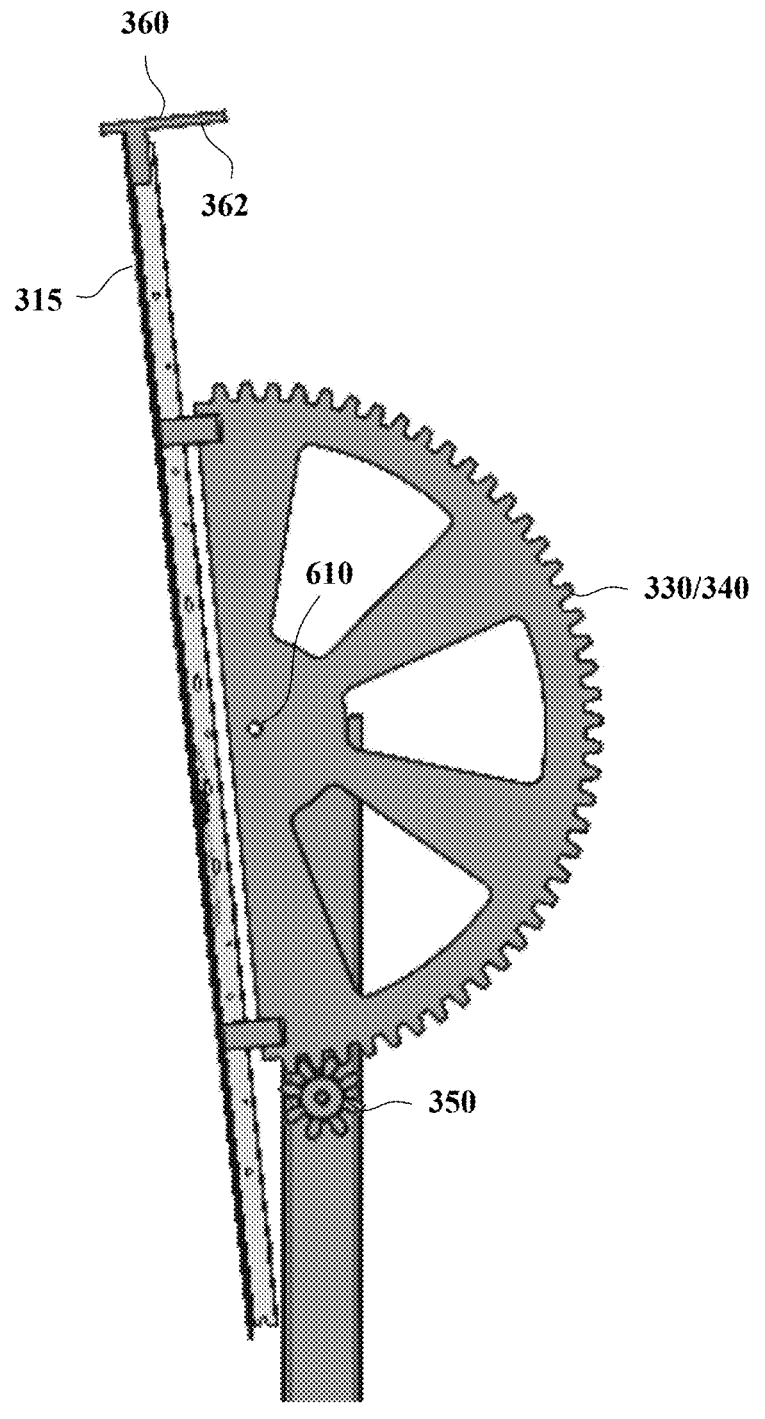
FIG. 6 depicts a side view of a row of solar panels in an obtuse orientation past the vertical orientation for hail protection in accordance with various embodiments of the invention.

It shall be noted that although a vertical orientation is shown in FIG. 5 for the first safety orientation 510, a safety orientation may even pass the vertical position, e.g., 10-20° over the vertical position for an obtuse orientation at 100-120°, as shown in FIG. 6. Such an obtuse orientation may further protect the front side of the panel from hail with a non-vertical fall trajectory, especially when high wind is encountered during a hail storm. In one or more embodiments, the safety orientation may be accompanied with physical backside protection, e.g., steel net, chicken wire, or a solid shield, that protects the back sheet or back glass of the panel from hail impact.

In one or more embodiments, the drive line 355 is supported by the pair of asymmetrical foundations 310/320, which provide a space for the plurality of solar panels 315 to be at a safety orientation, such as the first safety orientation 510 or the second safety orientation 520, for protection from falling hail.

The asymmetrical foundations 310/320 may be mounted directly on the ground with anchors 316/326 penetrating the soil to provide pull out and lateral resistance to counter the wind, snow and seismic loads that might affect stability of the drive line and solar panels. The asymmetric foundations may be mounted on small concrete (or other heavy materials) ballasts 312/322 that support the asymmetrical foundations during installation and prevent the solar panel structure from falling over from light winds and ground slopes. The concrete ballasts allow for delivering free-standing foundations/assemblies (or solar tables) and repositioning during the final alignment before the anchors are driven through the concrete ballasts.

In one or more embodiments, a bumper rail 360 may be mounted on an edge to protect the solar panels 315 from the impact force of falling hail stones. To dissipate hail impact, the bumper may have impact-absorbing features, e.g., a honeycomb structure, a rubbery structure, or a geometry that absorbs impact energy. The bumper rail 360 has a width d larger than a thickness of the solar panels 315 such that the bumper rail 360 may have an overhang beyond the front side of the solar panels 315 (as shown in FIG. 5) when the solar panels 315 are in the safe safety orientation 510 (e.g., a vertical orientation facing left side). In one or more embodiments, the solar panels may only have the bumper rail (besides tracker rotation) as protection from hail impact, or alternatively, they may have both bumper rail in combination with physical backside protection for more comprehensive protection.

Although one bumper rail is shown in FIG. 3, one skilled in the art shall understand that a bumper rail may be mounted on each edge such that no matter which direction the solar panels are oriented, there is always one bumper rail on top for protection. The upper bumper rail may cast shade on the solar panels when the solar panels are in PV operation, thus negatively affecting operation efficiency. Sine the tracker tracks symmetrical from east to west during the day, both edges of the solar panel will become the upper edge once during the day. The top bumper rail can only protrude a short distance past the front side of the solar panel, thus the impact on operation efficiency is limited. The bumper rail can also protrude further on the backside without causing any shading on the panels.

Furthermore, the pivot supports 610 on the foundations (e.g., asymmetrical foundations 310/320, A-frame foundations 710/720, or the I-beam foundations 910/920) may be configured in a way to allow the solar panels 315 to be oriented in a high-angle orientation, which is defined as a near-vertical orientation (e.g., between 70° and) 90°, a vertical orientation, or even an obtuse orientation 10-20° past the vertical orientation as shown in FIG. 6, with the bumper rail on top during a hail storm. In one or more embodiments, the bumper rail 360 may also have a back overhang 362 beyond the back side of the solar panels 315.

Figure 7:
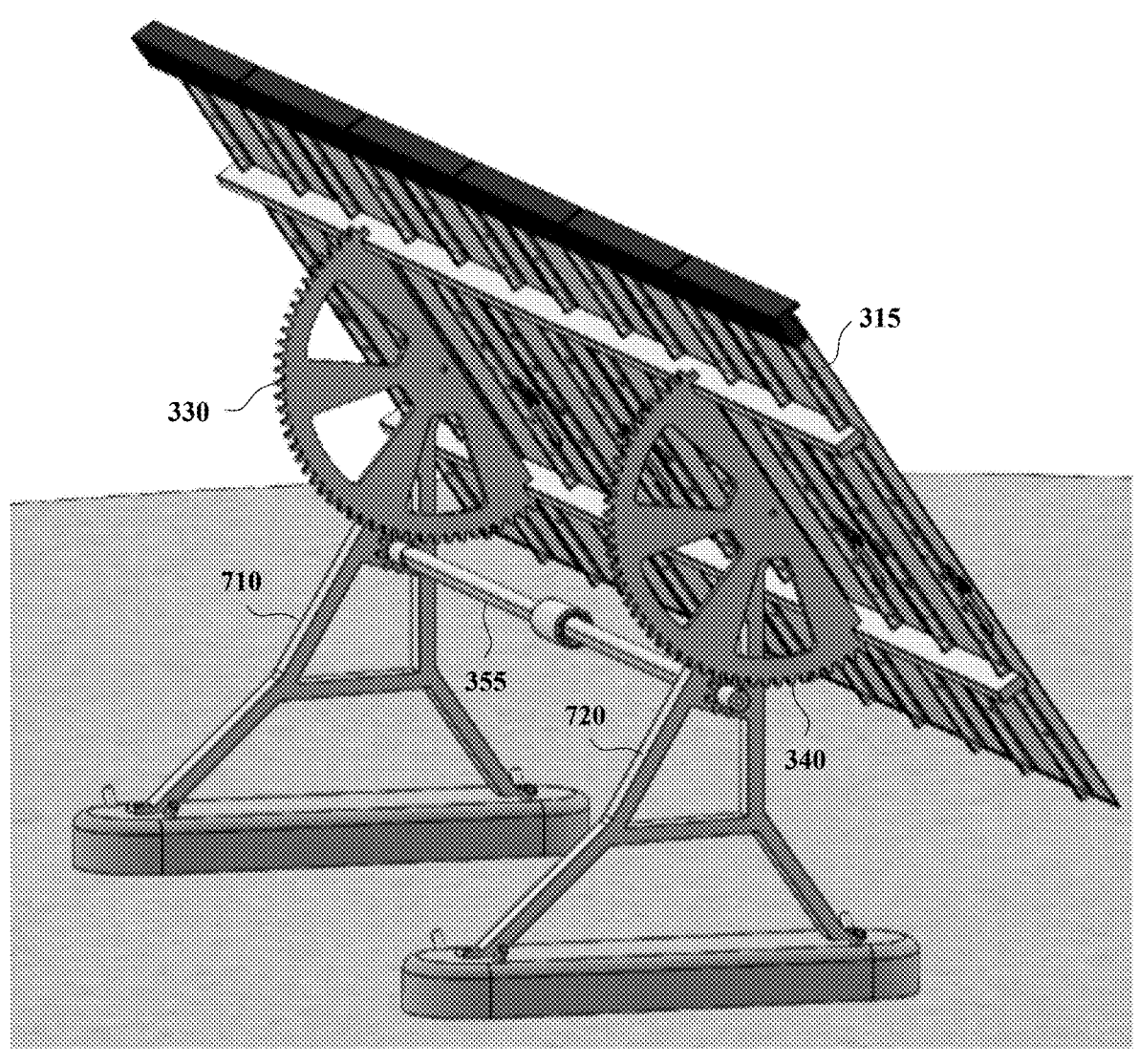
FIG. 7 depicts a perspective view of a row of solar panels in a normal tracking position supported by symmetrical A-frame foundations in accordance with various embodiments of the invention.

Such a back overhang in combination with a high-angle orientation (e.g., a vertical or an obtuse orientation) is able to provide excellent backside protection. Although the drive gear 350 is shown in FIG. 7 to drive the arc gears 330/340, one skilled in the art shall understand that various other mechanisms, such as a chain-driven mechanism, may also be used for driving the arc gears. Such variation shall also be within the scope of the present disclosure.

FIG. 7 depicts a perspective view of a row of solar panels in a normal tracking position supported by symmetrical A-frame foundations in accordance with various embodiments of the invention. The A-frame foundations 710/720 may also provide similar support to the drive line 355 and allow the arc gears 330/340 to rotate the solar panels 315 to a high-angle orientation for hail protection.

Figure 8:
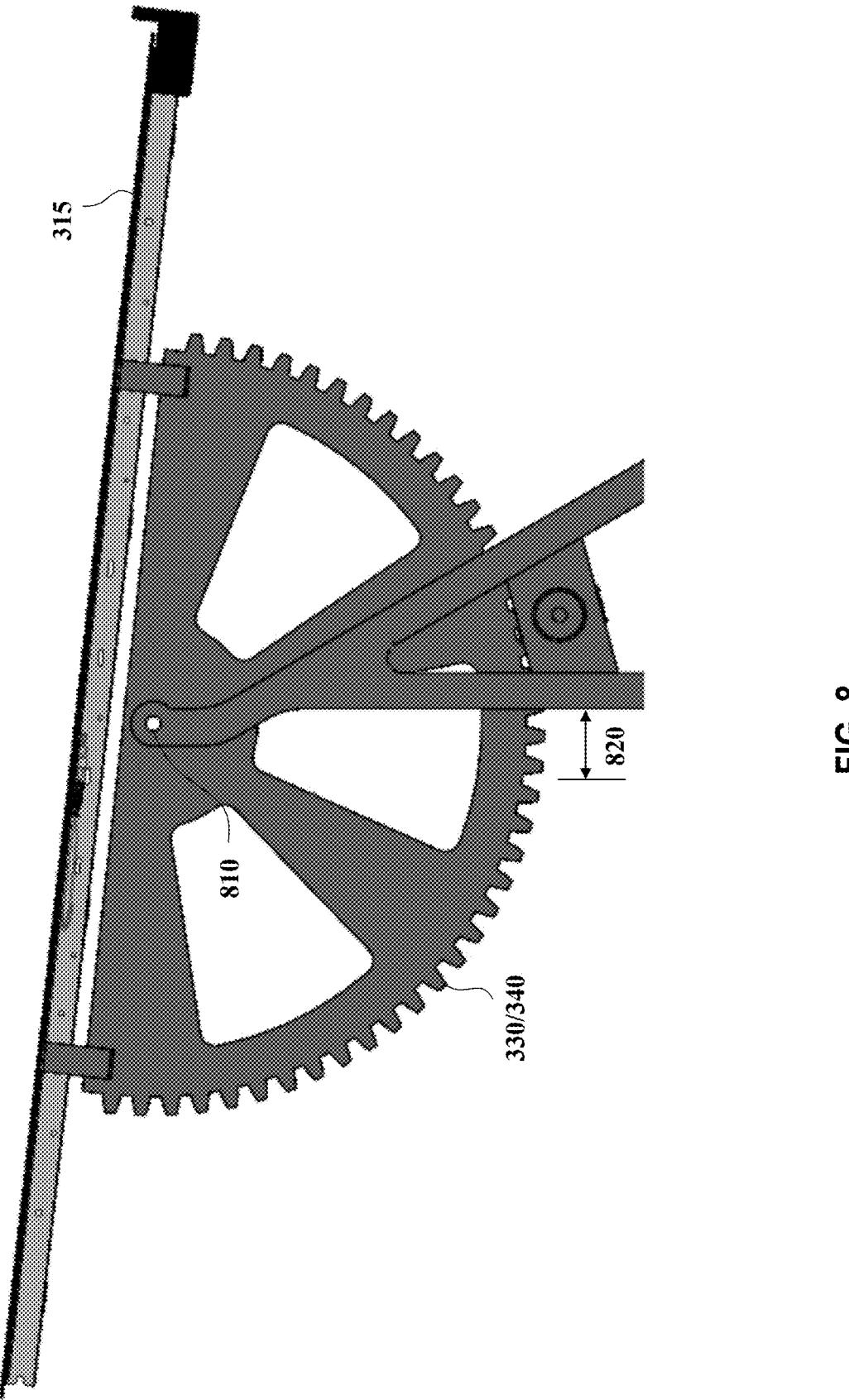
FIG. 8 depicts an asymmetrical pivot support that allows for high-angle stow in accordance with various embodiments of the invention.

FIG. 8 depicts an asymmetrical pivot support that allows for high-angle stow in accordance with various embodiments of the invention. The pivot support 810 for the arc gears 330/340 is an asymmetrical pivot support that is in an asymmetrical position with respect to the supporting frames (e.g., frames 310/320 or 710/720). The asymmetrical pivot support may be applicable not only on asymmetrical frames but also on traditional I-beam frames (e.g., the pivot support 610 as shown in FIG. 6). Such an asymmetrical setup provides a clearance 820 to allow a high-angle orientation (e.g., an obtuse angle) for the solar panels 315.

Figure 9:
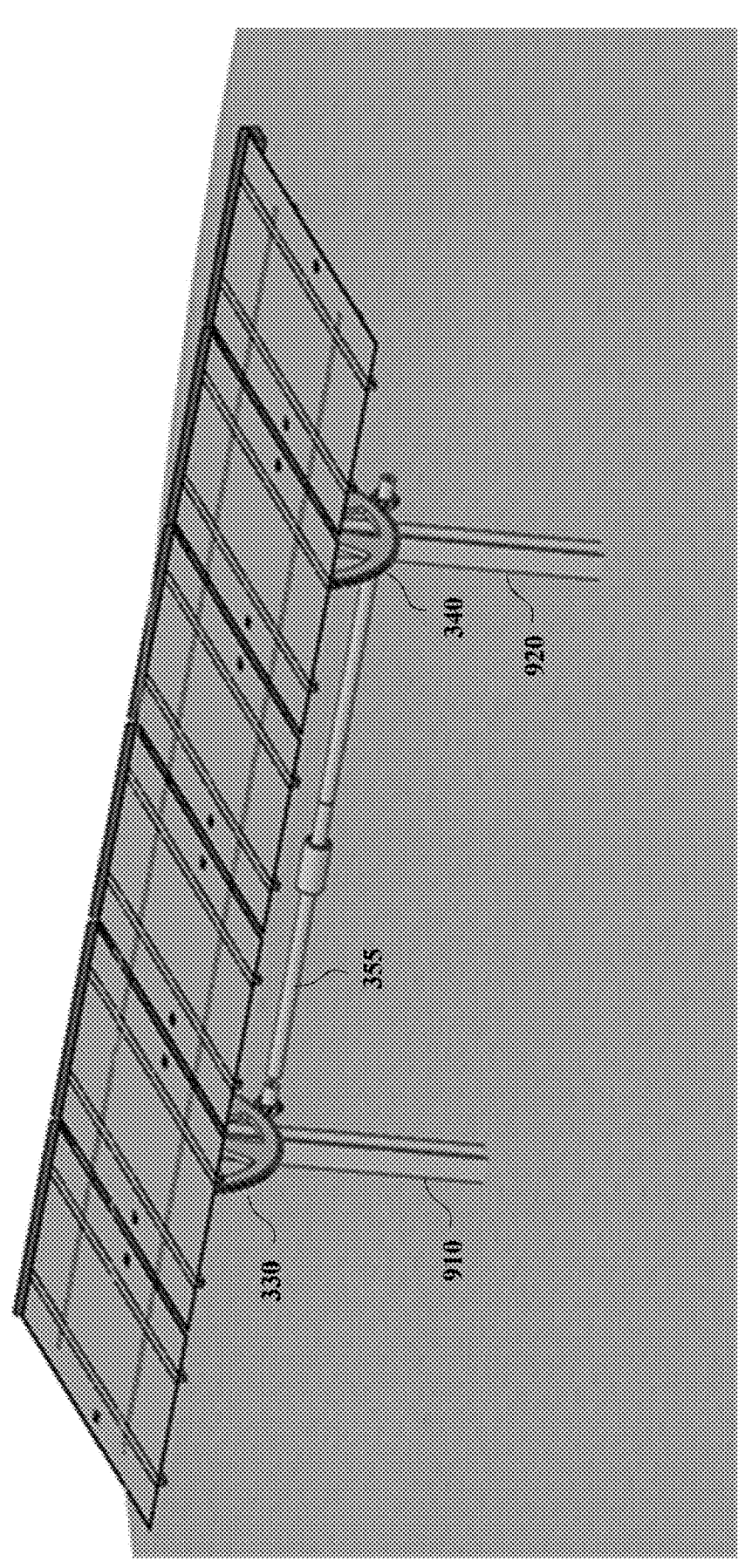
FIG. 9 depicts a perspective view of a row of solar panels in an operation position supported by I-beam foundations in accordance with various embodiments of the invention.
Figure 10:
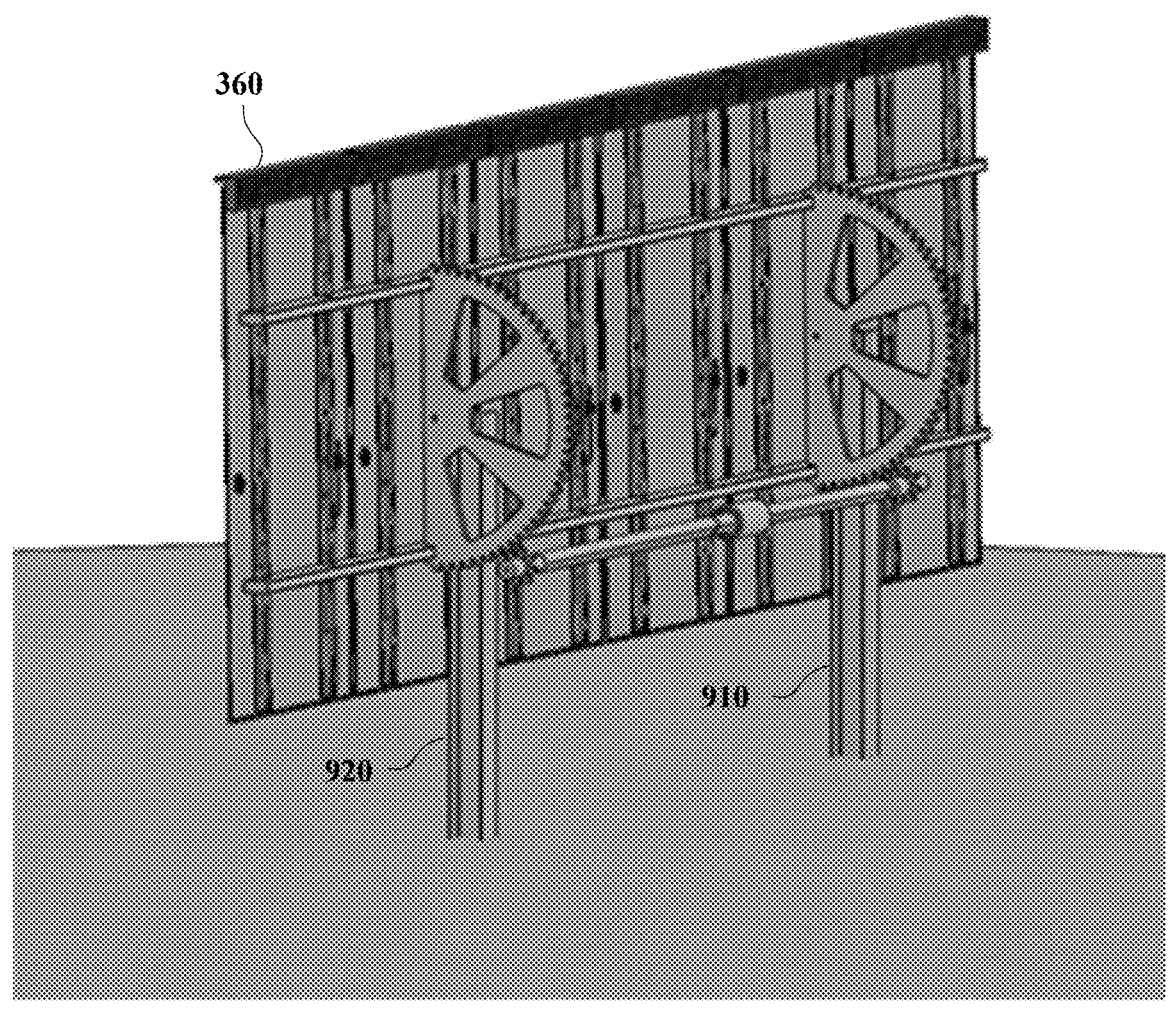
FIG. 10 depicts a perspective view of a row of solar panels in a protective position supported by I-beam foundations in accordance with various embodiments of the invention.

The solar panels 315, the gears 330/340, and the drive line 355 may also supported by traditional I-beam foundations. FIGS. 9-10 depict a perspective view of a row of solar panels in a normal tracking position and a perspective view of a row of solar panels in a protective position supported by I-beam foundations 910/920, in accordance with various embodiments of the invention. Such embodiments ensure that the arc gears are capable of being installed in a solar power plant with traditional I-beams.

Figure 11:
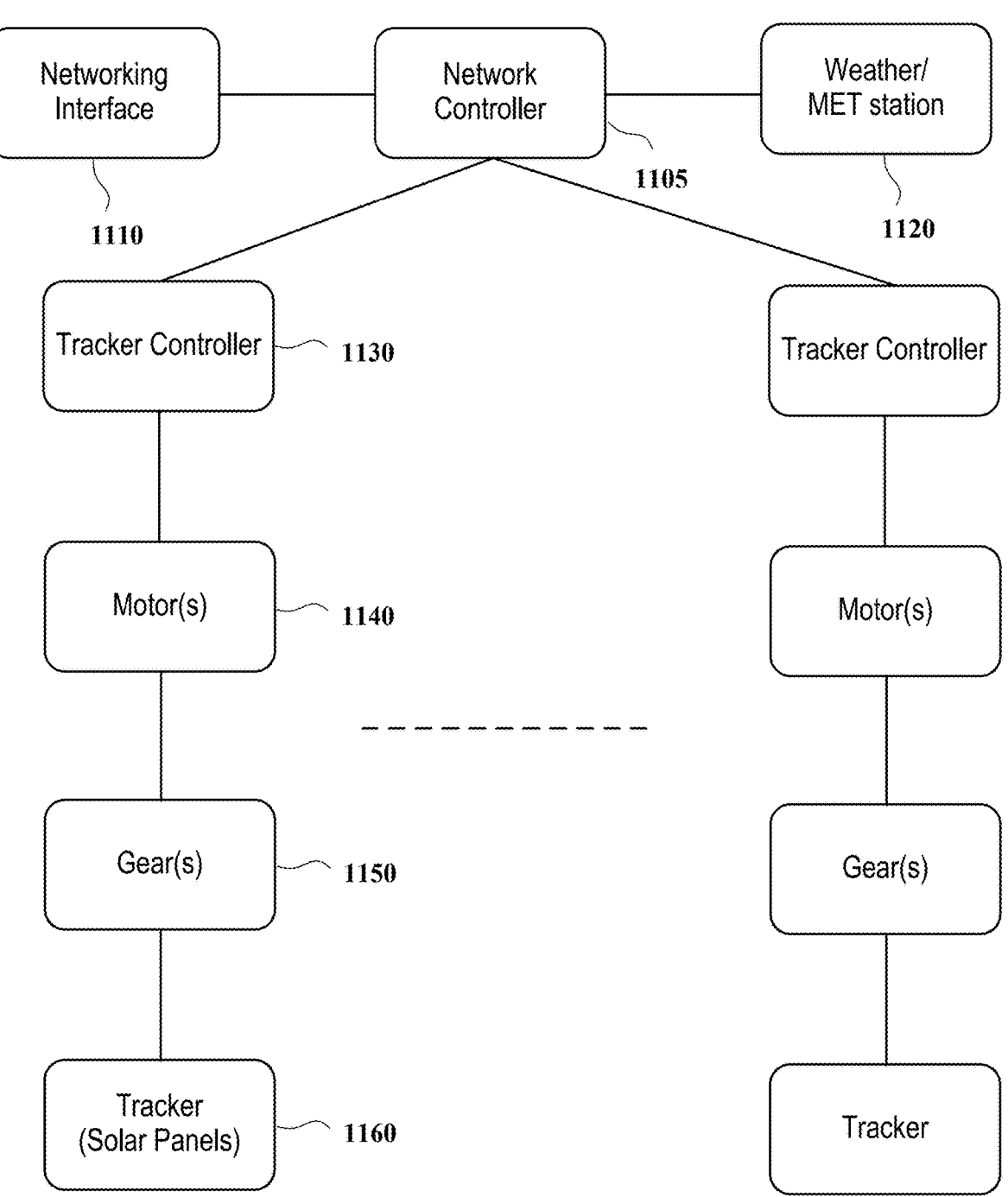
FIG. 11 depicts a block diagram of a solar panel hail protection system in accordance with various embodiments of the invention.

FIG. 11 depicts a block diagram of a solar panel hail protection system in accordance with various embodiments of the invention. The solar panel hail protection system comprises a network controller 1105 that couples to multiple tracker controllers 1130 with each tracker controller controlling one or more motors 1140 to adjust the tracking angle of a tracker 1160 via one or more gears 1150, a networking interface 1110, and a weather or meteorological (MET) station 1140. Each tracker controller 1130 typically controls a single row/single motor to rotate a tracker, which typically comprises 90-120 solar panels and is actuated by a single motor. In other embodiments, each tracker controller could control more than one tracker row and more than one motor in one or more rows, Communication between the network controller 1105 and each tracker controller 1130 may be wired communication or wireless communication, which may typically via Wi-Fi/Mesh Networks (e.g., ZigBee or Z-Wave), long-range wide area network (LoRaWAN), etc. Accordingly, the network controller 805 may remotely control each group of solar panels automatically for wind/snow or hail stow to minimize the environmental loads on the panels and structural components of the tracker system. Besides hail protection, each group of solar panels may also be positioned for operations and maintenance (O&M) work, such as panel washing and maintenance.

Typically, each tracker controller may also be tasked with updating the orientation angle of the group of solar panels for optimal operation efficiency. Such a task may be done by using an astronomical algorithm based on local time and position to find sunlight direction and the optimal tracking angle. The tracker controller may update its time from the internet from time to time via the network controller 1105. Given that the Sun moves roughly 1° every 4 minutes, such an update may not require a sub-second precision.

The weather station/MET station 1120 may be placed onsite at a solar power plant to collect real-time weather information and communicate the real-time weather information to the network controller 805. Hail stow or hail protection may be initiated based on remote weather forecasts, e.g., from the Nation Weather Service or National Oceanic and Atmospheric Administration (NOAA), onsite weather information collected by the MET station 840 (and one or more local hail detectors) deployed at the solar power plant, or a combination of both. Although hail stow may be initialized alone by a local weather signal from a local hail detector, such implementation might be challenging since the local weather signal may not be able to provide enough response time for the solar panels to be oriented into a safe position, especially considering it usually takes several minutes for the solar panels to change orientation in a tracking range from −60° to 60°.

FIG. 12 depicts a process for operating the solar panels between an operative position and a protective position in accordance with various embodiments of the invention. In step 1205, weather information for a solar power plant is received. The solar power plant comprises multiple trackers, with each track comprising a group of solar panels. Each tracker is controlled by a tracker controller via one or more motors for tracking angle or solar panel orientation adjustment. The weather information may be from remote weather forecasts, onsite weather information, or a combination thereof, and it may comprise forecast and collected wind speed, wind direction, precipitation amount, hail size, etc.

In step 1210, in response to one or more severity thresholds being met, a safe position for trackers or solar panels at the solar power plant is determined at a network controller for the solar power plant, based on at least the weather information and a position of solar panels. A severity threshold may be a size of hail (e.g., 2 inches in diameter), a wind speed (e.g., 45 mph), a forecasted hail storm duration (e.g., 30 minutes), etc. The safe position may be a pre-determined orientation of solar panels or determined based on wind direction measured or forecast. For example, when a high wind speed is predicted, the pre-determined tracking angle may be a tracking angle with the back sides facing the wind to minimize horizontal hail impact due to the strong wind, besides vertical hail impact due to gravity.

In step 1215, the network controller sends the safe position to each tracker controller. In step 1220, each tracker controller adjusts, via-one or more motors, a tracking angle to the safe position. In step 1225, upon a safe condition being met (e.g., hailstorms gone, no panel damage), each tracker is adjusted from the safe position back to an operation position for normal photovoltaic (PV) operation.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A system for solar panel protection comprising:
   one or more tracker controllers, each tracker controller is configured to control a tracking angle of a tracker among multiple trackers in a solar power plant, each tracker comprises a group of solar panels and a bumper rail mounted on at least an edge along the group of solar panels;
   a network controller that couples to the one or more tracker controllers, the network controller is configured to perform operations comprising:
      receiving weather information for the solar power plant;
      in response to a severity threshold being met, determining a safe position at a high-angle orientation for each tracker in the solar power plant based on at least the weather information; and
      sending the safe position to each tracker for each tracker to adjust a corresponding tracker to the safe position; and
   wherein the bumper rail is on top of the group of solar panels when each tracker is at the safe position, the bumper rail has a width larger than a thickness of the group of solar panels to form an overhang beyond a front side of the group of solar panels when each tracker is at the safe position.

2. The system of claim 1 wherein the high-angle orientation is a near-vertical orientation, a vertical orientation, or an obtuse orientation past the vertical orientation.

3. The system of claim 1, wherein each tracker comprises:
   a pair of supporting purlins coupled to the group of solar panels;
   a pair of gears coupled to the pair of supporting purlins; and
   a drive gear mounted on a drive line powered by one or more motors to drive the pair of gears to adjust the tracking angle of each tracker, the one or more motors are controlled by a corresponding tracker controller.

4. The system of claim 3, wherein the pair of gears are arc gears.

5. The system of claim 3, wherein the pair of gears are rotatably coupled to a pair of asymmetric foundations via asymmetric pivot supports, the asymmetric pivot supports allow a clearance to allow the high-angle orientation for each tracker.

\* \* \* \* \*